United States Patent
Krivacic et al.

(10) Patent No.: US 6,707,481 B1
(45) Date of Patent: Mar. 16, 2004

(54) LIGHT SOURCE MODULATOR

(75) Inventors: Robert T. Krivacic, San Jose, CA (US); Alan G. Bell, Palo Alto, CA (US); Douglas N. Curry, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,544

(22) Filed: Jan. 19, 2000

(51) Int. Cl.[7] .................................................. B41J 2/47
(52) U.S. Cl. ........................................ 347/239; 347/255
(58) Field of Search ................................. 347/236, 237, 347/238, 240, 246, 247, 251, 252, 253, 255, 239

(56) References Cited

U.S. PATENT DOCUMENTS

| | | | |
|---|---|---|---|
| 5,485,289 A | 1/1996 | Curry | 358/2.1 |
| 5,732,162 A | 3/1998 | Curry | 382/294 |
| 5,917,535 A * | 6/1999 | Corona | 347/238 |
| 6,166,757 A * | 12/2000 | Murano | 347/240 |

* cited by examiner

*Primary Examiner*—Hai Pham
(74) *Attorney, Agent, or Firm*—Oliff & Berridge, PLC

(57) ABSTRACT

A light source modulator and method of modulating a light source use a lower bandwidth input signal during rendering of image data, which is less susceptible to systematic error. The modulation scheme improves the efficiency of use of high speed memory by limiting a number of intensity level transitions to a single transition per output pixel. In conjunction with the limitation of transitions per rendering of each output pixel, data is provided to the modulator that indicates an intensity level to be provided by the modulator and a timing of a transition to that intensity level. In accordance with the exemplary embodiments of the invention, an intensity level may be a minimum intensity level, a maximum intensity level and at least one intermediate intensity level which is intermediate between the minimum and maximum intensity levels.

19 Claims, 5 Drawing Sheets

LIGHT SOURCE MODULATOR

BACKGROUND OF THE INVENTION

1. Field of Invention

The present invention is related to rendering images. More specifically, the present invention is related to an image rendering system and method whereby the ability to precisely render images is improved without detrimentally affecting the amount of bandwidth and memory allocation necessary for image rendering.

2. Description of Related Art

Conventionally, it is difficult to phase shift halftone dots with sub-scan precision in a process direction without causing unwanted tone variation and visual systematic error, e.g., auto moire and superposed moiré. Conventional halftoning methods and systems adjust or warp the image data produced by an image data generator, such as a grayscale image generator, or binary image generator, to minimize moire. This warping is performing by rendering image data utilizing electronic registration, as disclosed in U.S. Pat. No. 5,732,162 to Douglas N. Curry, assigned to Xerox Corporation and incorporated herein by reference in its entirety. Such systems can use high speed dithering with a high speed digital shift-register.

Although, dithering has a systematic noise associated with it because of the number of modulation transition levels performed during rendering of each output pixel, such image rendering systems are practically implemented because they do not require an excessive bandwidth to transmit data for rendering each output pixel. An output pixel is a unit of data included in an array of output pixel data at, e.g., 300 or 400 spots per inch resolution, that represents image data and is provided to a modulator in an image rendering system to render images. An output pixel may span $\frac{1}{300}^{th}$ or $\frac{1}{400}^{th}$ of an inch in a fast-scan direction. There may be four to eight dithered bits within each output pixel.

Warping the image data can be utilized to compensate for distortions in the imager, but may not be enough to compensate for moire introduced by these distortions. This is because merely warping the image data to minimize the moire patterns results in offsets within the image data that have no corresponding adjustment or warp in the halftone screens used to render color image separation layers. Therefore, moire pattern minimization is conventionally improved by also warping halftone screens in a halftone screen system to correspond to the warping of the image data, as disclosed in U.S. Pat. No. 5,485,289 to Curry, assigned to Xerox corporation and incorporated herein by reference in its entirety.

Although such methods and systems phase shift halftone dots in two dimensions with minimal tone variation and systematic error, such systems require a significant amount of bandwidth for transmitting image data power levels to a print engine. This is because such systems render image data by using modulation via high-speed, analog digital-to-analog converters (DACs). As a result, these systems utilize an excessive amount of data transmission bandwidth because of the amount of data necessary to perform this modulation, i.e., bandwidth necessary to transmit approximately double the number of data bits used to modulate light source during image rendering.

Additionally, recent developments in hexagonal halftone screen phaseshifting have increased the already present need to find a feasible way to implement halftone dot phaseshifting during image rendering. See, for example, U.S. patent application Ser. No. 09/244,767, filed on Feb. 5, 1999, by Douglas N. Curry, assigned to Xerox Corporation and hereby incorporated by reference in its entirety.

FIG. 1 illustrates conventional image rendering in a fast-scan direction. As shown in FIG. 1, a light source is modulated between full-on and full-off over the span of the output pixel to render a grayscale value for the output pixel. This modulation is known as dithering. Conventionally, it is preferable that dithering is performed at the highest frequency possible in order to provide an even tone to grayscale values rendered for an output pixel. Since there are 4× of these independently addressable bits for each output pixel, the dither rate is said to be 4× high addressability. By modulating the light source so that light source has a duty-cycle of 50%, a grayscale value is rendered that is halfway between that provided when the light source is on 100% and when the light source is off. In this way, the duty-cycle of the light source is adjusted to provide various grayscale values for output pixels.

However, as explained above, dithering has an associated noise that results in systematic errors. As a result, use of conventional dithering can cause moire patterns in the rendered image. Additionally, because of the high frequency of modulation level transitions a significant amount of bandwidth and high speed memory is necessary to render grayscale values using electronic registration with high-addressability.

SUMMARY OF THE INVENTION

Therefore, the present invention allows implementation of phase shifting of halftone dots in conjunction with modulation of a light source using a smaller amount of bandwidth from a remote video source. Specifically, a light source is modulated with a restricted amount of data provided by a remote video source. For example, it is preferred that a light source modulator designed in accordance with the exemplary embodiments of the invention receives only four bits of data per output pixel. The benefit of restricting the number of bits is that high speed memory allocation and costs are minimized.

It is advantageous to minimize the amount of data to be transmitted while providing the maximum amount of gray values used for image rendering. The present invention provides a hybrid analog/digital laser modulator and method of modulation for rendering images. Such a modulator and method are advantageously useful in conjunction a printing system that phase shifts binary halftone dots. By utilizing the exemplary invention embodiments, implementation of phaseshifting halftone dots is both more feasible, practical to implement and useful because of resulting lowered memory allocation requirements.

Exemplary embodiments of the invention combine the use of a low noise DAC with digital shift-registers to obtain a lower bandwidth modulation that is less susceptible to systematic error. Such a modulation scheme is preferably implemented with systems which phase shift halftone dots during image rendering.

The exemplary embodiments of the invention separately provide the capability to provide higher image data processing speeds while providing a maximized number of gray levels for image rendering and minimizing the necessary amount of bandwidth consumed during image data transmission to and processing by a modulator. Such a modulator may be used in an image rendering system that implements laser modulation to perform image rendering.

The exemplary embodiments of the invention improve the efficiency of use of high speed memory by limiting a number of modulation level transitions to a single transition per output pixel. In conjunction with the limitation of transitions per rendering of each output pixel, data is provided to the modulator which indicates an intensity level to be provided by the modulator and a timing of a transition to that intensity level. In accordance with the exemplary embodiments of the invention, an intensity level may be a minimum intensity level, a maximum intensity level and at least one intermediate intensity level which is intermediate between the minimum and maximum intensity levels.

In a first exemplary embodiment of the invention, intensity levels include a minimum level, a maximum level and one intermediate intensity level that is intermediate between the minimum and maximum intensity levels.

In a second exemplary embodiment of the invention, the number of intensity levels is increased to four, thereby allowing more flexibility to render grayscale images. Thus, in the second exemplary embodiment, the intensity levels include a minimum level, a maximum level and two intermediate intensity levels that are intermediate between the minimum and maximum intensity levels.

These and other features and advantages of this invention are described in, or are apparent from, the following description of the apparatus/systems and methods according to this invention.

BRIEF DESCRIPTION OF THE DRAWINGS

Various embodiments of this invention will be described in detail, with reference to the following figures, wherein.

DETAILED DESCRIPTION OF PREFERRED EMBODIMENTS

The exemplary embodiments of the invention provide a method and system for modulating a light source during image rendering with minimal necessary bandwidth for data input to the modulator, minimized tone variation during rendering of output pixels and minimized systematic error. As a result, the exemplary embodiments of the invention make positioning in fast-scan and slow-scan directions independently adjustable. By affecting the timing of light source modulation, the modulator controls rendering in the fast-scan direction. Control of rendering in the slow-scan direction is provided by manipulating the amount of power produced by the light source. This is done by the modulator's control of the power intensity provided to the light source. In this regard, the modulator includes a DAC, or adjustable current source, that includes a plurality of constituent current sources positioned in parallel with one another that operate in various combinations to provide different levels of power to render different grayscale values.

Figure 1:
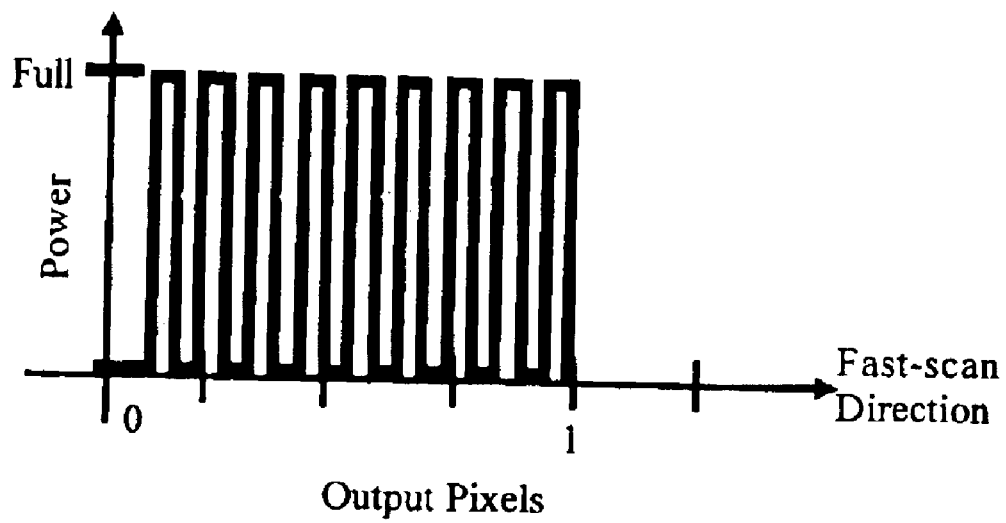
FIG. 1 is a graph illustrating an image rendering operation using conventional dithering at 4× addressability.
Figure 2:
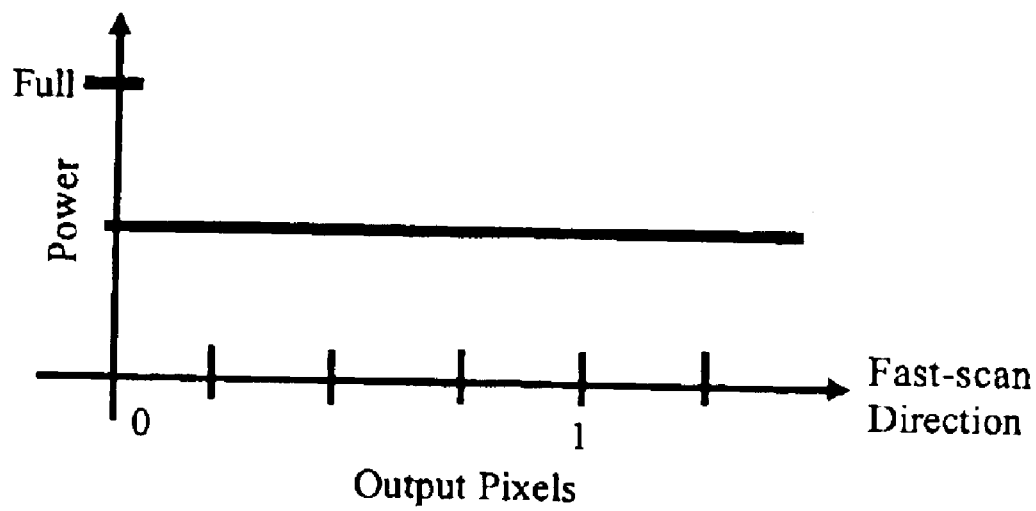
FIG. 2 is a graph illustrating an image rendering operation using modulation in accordance with the exemplary embodiments of the invention.

The exemplary embodiments of the invention replace a conventional dithering mechanism with a modulator that operates to modulate a light source, e.g., a laser diode, using current sources to provide intermediate grayscale values. As shown in FIG. 2, rather than modulating the light source between full-on and full-off as in FIG. 1, the light source is modulated to provide a uniform, intermediate intensity level of 0.5 over the full range of the output pixel. This is performed by adjusting the amount of power provided to the light source, which in turn affects the intensity of the light source. By manipulating the intensity of the light source rather than operating the light source in a strict on-off manner, the amount of data transmitted and stored to control the light source is reduced. This is because it is not necessary to send data required to perform many transitions in intensity level, i.e., repeated on/off and off/on transitions, to provide an intermediate grayscale value over a single output pixel.

The effectiveness of the exemplary embodiments can best be explained with a simple example using an electronic registration engine such as that described in U.S. Pat. No. '162. The interpolator for such a system operates at up to 800 samples per inch in the fast-scan direction, and the scan pitch is 1600 scans per inch in the slow-scan direction. As explained in U.S. Pat. No. '162, such an engine is capable of rendering image data with 3200 bits per inch addressability in both the fast and slow-scan directions. Therefore, the fast-scan resolution must be multiplied by four (4 bits per sample×800 samples per inch=3200 bits per inch addressability) and the slov/scan-resolution must be multiplied by two (2 bits per sample×1600 scans per inch=3200 bits per inch addressability).

However, 3200 bits per inch addressability requires a significant amount of bandwidth and high speed memory allocation Therefore, the present invention may be utilized to reduce the necessary amount of bandwidth and memory cost while maximizing the number of grayscale values available. Accordingly, 4× shift-registers are used to provide the fast-scan resolution. Since dithering is not required, only one intensity level transition is allowed in the shift-register during each $\frac{1}{800}^{th}$-inch interval. A low noise DAC including an adjustable current source with at least one intermediate intensity level is used to provide the slow-scan resolution.

Figure 3:
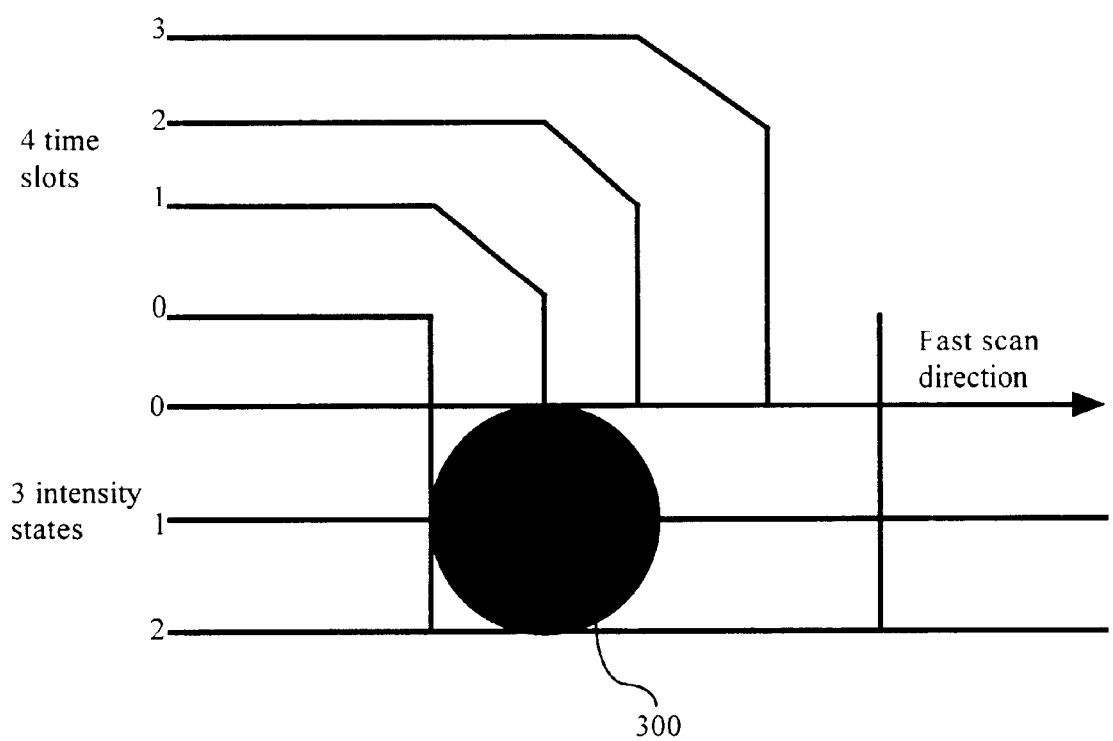
FIG. 3 is a diagram used to illustrate how control of timing and intensity relate to an image rendering laser spot.

FIG. 3 illustrates how control of timing and intensity relate to an image rendering laser spot 300 used in conjunction with a system that provides 3200 sits per inch addressability. The fast-scan direction is divided into four time-slots per $\frac{1}{800}^{th}$ of an inch: 0, 1, 2 and 3, which provides 3200 bits per inch addressability (800×4=3200). During any one of these time-slots, a transition of the modulation intensity can occur. However, in accordance with the exemplary embodiments of the invention, only one transition can occur within all the time-slots of the output pixel. Therefore, during movement in the fast-scan direction over a distance of one inch, the position transitions through, at most, 3200 time-slots and 800 intensity level transitions may occur.

The slow-scan direction (at 1600 scans per inch) is divided into three separate intensity levels per $\frac{1}{1600}^{th}$ of an inch: 0, 1 and 2 respectively corresponding to zero, half power and lull power of a modulated light source. This also provides 3200 bits per inch addressability in the slow-scan direction because each scan it; subdivided into two halves (1600×2=3200). Intensity state zero corresponds to no operation of the adjustable current source. Intensity state one corresponds to the adjustable current source providing half-power. Finally, intensity state two corresponds to the adjustable current source providing full-power.

The exemplary embodiments of the invention are able to adjust the intensity level and minimize the amount of data used to perform image rendering by limiting the amount of image rendering data used to control modulation of the light source.

Figure 4:
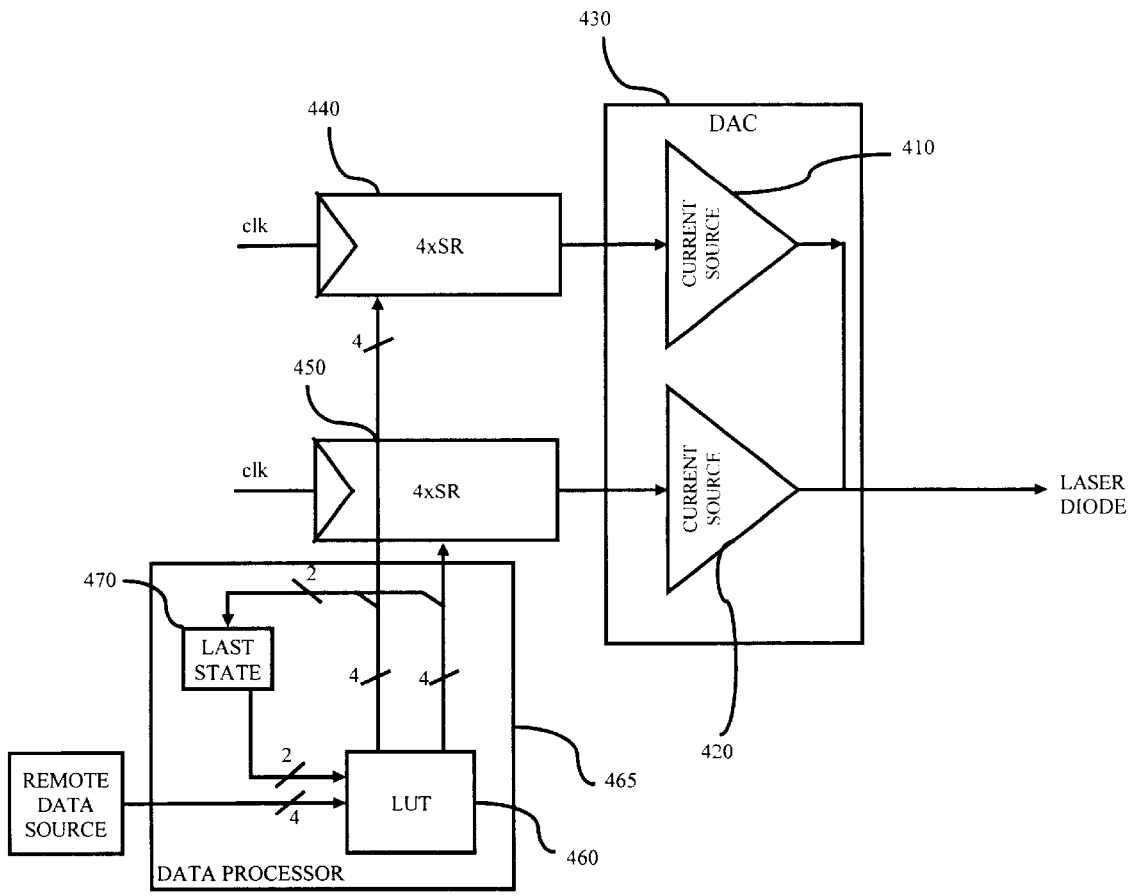
FIG. 4 illustrates a modulator designed in accordance with a first exemplary embodiment of the invention.

FIG. 4 illustrates a modulator 400 designed in accordance with a first exemplary embodiment of the invention. Modulator 400 includes two current sources 410 and 420 that serve as the adjustable current source and are part of DAC 430. The modulator also includes two 4x shift-registers 440 and 450 coupled to the two current sources 410 and 420 respectively. The modulator also includes an LUT 460 and a last-state-register 470, both stored in a data processor 465. The last-state-register 470 stores data indicating the last states output to the two shift-registers 440 and 450.

Both current sources 410 and 420 are set to provide one-half the power necessary to generate nominal, full exposure level. By optionally operating the current sources 410, 420 individually and in tandem, the current sources can be driven to sum to 0, ½ or full power. That is, when both current sources 410 and 420 are not operated the resulting power sum provided to the light source is 0. When one current source of current sources 410 and 420 is operated, the resulting power sum is half of full power. When both currents sources 410 and 420 are operated, the resulting power sum is full power. This tandem operation of the current sources 410 and 420 provides the two times slow-scan addressability, i.e., 2 bits per sample×1600 scans per inch=3200 bits per inch addressability.

A nibble, or four bits, of image data from a remote data source are provided to the data processor 465 of the modulator 400 and compared with the entries in the LUT 460. Such a remote data source may be, for example, a data file stored in memory coupled to the modulator, output data from a scanning device or any other now known or subsequently developed mechanism for providing image data. Based on the four bits of image data provided by the remote data source and the comparison of that data with the entries of the LUT 460, the data processor 465 outputs instruction data to the 4x shift-registers 440 and 450. The instruction data is in the form of a data nibble that indicates a present intensity level to be implemented during a specific time-slot by the current sources 410 and 420 during rendering of a presently rendered output pixel. The shift-registers 440, 450 control the operation of the current sources 410, 420, respectively, to control the power output to the light source during image rendering. Therefore, for each nibble of image data provided by the remote data source, the light source is modulated to render an output pixel.

Additionally, two bits indicating the intensity levels sent to the shift-registers 440 and 450 are transmitted to the last-state-register 470 from the LUT 460. Each of these two bits indicates the last intensity state of the current sources 410, 420, e.g., 00 indicates both current sources off, 01 indicates current source 410 was off and current source 420 was on, etc. Because only one intensity transition is allowed during rendering of each output pixel, the data sent to the last-state-register 470 is used by the data processor 465 to provide instructions on how to perform a next intensity level transition, as explained below. Thus, a present intensity level input to the shift-registers 440 and 450 is saved in the last-state-register 470 and is used to formulate instruction data on how to perform a subsequent intensity level transition in a next output pixel.

The exemplary embodiments of the invention capitalize on the fact that dithering is not used. Only one intensity level transition is allowed in each shift-register 440, 450 during rendering of each output pixel. This results in a decreased amount of bandwidth necessary to transmit the data controlling modulation of the light source during rendering of an output pixel.

In the exemplary embodiments the data nibbles provided by the LUT 460 to the shift registers 440, 450 indicate the intensity level transition occurring during the rendering of an output pixel. Therefore, each bit of a nibble of data $B_3B_2B_1B_0$ corresponds to an intensity of a shift register during one of the four time-slots illustrated in FIG. 3. Accordingly, bit $B_3$ corresponds to the intensity level of a shift register at time-slot 0, bit $B_2$ corresponds to the intensity level of that shift register at time-slot 1, bit $B_1$ corresponds to the intensity level of that shift register at time-slot 2 and bit $B_0$ corresponds to the intensity level of that shift register at time-slot 3.

As shown in Table 1, a nibble, or four bits, provides for 16 different data values. Although, as explained above, each of these values may indicate intensity level transitions and corresponding transition time-slots instructions provided by the LUT 460 to the shift registers 440, 450, the exemplary embodiments of the invention do not use all these values. This is because the number of intensity level transitions is limited to one per output pixel.

TABLE 1

| Decimal Value | Corresponding Binary Nibble Values |
| --- | --- |
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

For example, the nibble value 1011 sent from LUT 460 to shift register 440 would indicate a transmission to intensity level 0 at time-slot 1 and a second transition to intensity level I at time-slot 2. However, as explained above, the number of intensity level transitions is limited to one.

Therefore, the exemplary embodiments utilize only those nibbles from Table 1 that indicate a single transition over time-slots 0–3. Accordingly, the subset of nibbles transmitted from the LUT 460 in the data processor 465 to the shift-registers 443, 450 is as shown in Table 2.

TABLE 2

| Transition to Intensity level | At Time-slot | Corresponding Nibble Values |
| --- | --- | --- |
| 0 | 0 | 0000 |
| 1 | 3 | 0001 |
| 1 | 2 | 0011 |
| 1 | 1 | 0111 |
| 1 | 0 | 1111 |
| 0 | 3 | 1110 |

TABLE 2-continued

| Transition to Intensity level | At Time-slot | Corresponding Nibble Values |
|---|---|---|
| 0 | 2 | 1100 |
| 0 | 1 | 1000 |

Therefore, half of the sixteen possible four-bit patterns are discarded because they define two or more intensity level transitions per nibble. Nevertheless, the eight values shown in Table 2 constitute all the patterns necessary to produce 3200 bits per inch addressability in the fast-scan direction.

Accordingly, four bits of intensity level and transition time data are provided by the LUT 460 of the data processor 465 to each of the shift-registers 440, 450. It is important to note that the nibble of instruction data provided to shift-register 440 can and often will be different than the nibble of instruction data provided to shift-register 450. However, the timing of any intensity level transition will be the same for both shift-registers 440, 450 if both shift-registers are instructed to transition to a different intensity level.

Table 3 enumerates one example of the twelve possible permutations of transition time/intensity level information provided by the remote source to the data processor 465 according to the first exemplary embodiment. The first column indicates the time slot in which a transition to the new intensity level. The second column indicates the data actually transmitted to the LUT 460 of the data processor 465 by the remote data source. The third column indicates the instruction data nibble transmitted to the shift-register 440. The fourth column indicates the instruction data nibble transmitted to the shift-register 450.

TABLE 3

| TIME-SLOT/ INTENSITY STATE | LUT INPUT | OUTPUT TO SHIFT- REGISTER 440 | | | | OUTPUT TO SHIFT- REGISTER 450 | | | |
|---|---|---|---|---|---|---|---|---|---|
| 0/0 | 0000 | 0 | 0 | 0 | 0 | 0 | 0 | 0 | 0 |
| 0/1 | 0001 | 0 | 0 | 0 | 0 | 1 | 1 | 1 | 1 |
| 0/2 | 0010 | 1 | 1 | 1 | 1 | 1 | 1 | 1 | 1 |
| 1/0 | 0011 | LS | 0 | 0 | 0 | LS | 0 | 0 | 0 |
| 1/1 | 0100 | LS | 0 | 0 | 0 | LS | 1 | 1 | 1 |
| 1/2 | 0101 | LS | 1 | 1 | 1 | LS | 1 | 1 | 1 |
| 2/0. | 0110 | LS | LS | 0 | 0 | LS | LS | 0 | 0 |
| 2/1 | 0111 | LS | LS | 0 | 0 | LS | LS | 1 | 1 |
| 2/2 | 1000 | LS | LS | 1 | 1 | LS | LS | 1 | 1 |
| 3/0 | 1001 | LS | LS | LS | 0 | LS | LS | LS | 0 |
| 3/1 | 1010 | LS | LS | LS | 0 | LS | LS | LS | 1 |
| 3/2 | 1011 | LS | LS | LS | 1 | LS | LS | LS | 1 |

In Table Three, "LS" indicates the last modulation intensity state input to each shift-register 440, 450 during rendering of the previous output pixel. Therefore, when the data processor 465 formulates the instruction data for the shift-registers 440, 450, the data processor uses the last state data stored in the last-state-register 470.

For example, the nibble 0110 will be-input to the data processor 465 to instruct a transition to intensity level 0 in the second time-slot, as shown in FIG. 3. The corresponding nibble values output to both shift-registers 440, 450 are "LS LS 0 0", where LS is the previous state of the shift-registers 440, 450 stored in last-state-register 470. Each of the bit values of the nibble corresponds to a time-slot. Therefore, the first two time-slots, 0 and 1, as shown in FIG. 3, correspond to the instruction to remain at the last state entered in the shift-register 440, 450. The second two time-slots, 2 and 3, correspond to the instruction to provide an intensity level of 0. As a result, a transition to intensity level 0 occurs at time-slot 2 and that intensity level is maintained through completion of the output pixel rendering.

In another example, the nibble 0100 is input to the data processor 465 to instruct a transition to intensity level 1 in the second time-slot 1, as shown in FIG. 3. In this example, the corresponding nibble values output to the shift-registers 440 and 450 are different. Shift-register 440 receives instruction data nibble "LS 0 0 0", where LS is the previous state of the shift-register 440 stored in last-state-register 470. Shift-register 450 receives instruction data nibble "LS 1 1 1, where LS is the previous state of the shift-register 450 stored in last-state-register 470. Each of the bit values of the nibble correspond to a time-slot. Therefore, the first time-slot, 0, as shown in FIG. 3, for each shift-register 440, 450 corresponds to the instruction to remain at the last state entered in the shift-register 440, 450. However, the second time-slot, 1, correspond to the instruction to perform an intensity level transition. For shift-register 440, the transition is to intensity level 0. For shift-register 450, the transition is to intensity level 1. These intensity levels are maintained through completion of the output pixel rendering because only one intensity level transition is permitted per output pixel.

It is important to note that there need not be any intensity level transition during rendering of an output pixel. Such would be the case when an intensity level remains constant when rendering a number of output pixels that each have the same grayscale value. All that is required is that there be, at most, one intensity level transition occurring during rendering of an output pixel. The nibbles of instruction data provided by the data processor 465 allow a transition between any two of the three intensity states, i.e., 0, 1 and 2, at any of the four time intervals, i.e., 0, 1, 2 and 3, as shown in FIG. 3, provided that the transition does not require more than one bit transition.

It is also possible that only one of the shift-registers would experience an intensity level transition. For example, suppose that the intensity level at which the previous output pixel was full-power intensity. This means that the last state, or LS of each shift-register 440, 450 is 1, indicating operation of both current sources 410 and 420. However, the instructions from the remote data source may indicate that a next output pixel should be rendered with a transition in the third time-slot to intensity level half-power intensity. Thus, shift-register 440 receives nibble "LS LS 0 0" and shift-register 450 receives nibble "LS LS 1 1". As a result, the shift-register 440 will maintain last state, i.e., 1, until the third time-slot when it ceases to operate so as to provide the new half-power intensity level. Shift-register 450 maintains its last state, i.e., 1, until the third time-slot as well. However, shift-register 450 does not actually transition because its last state is the same as the new state, i.e., 1.

Figure 5:
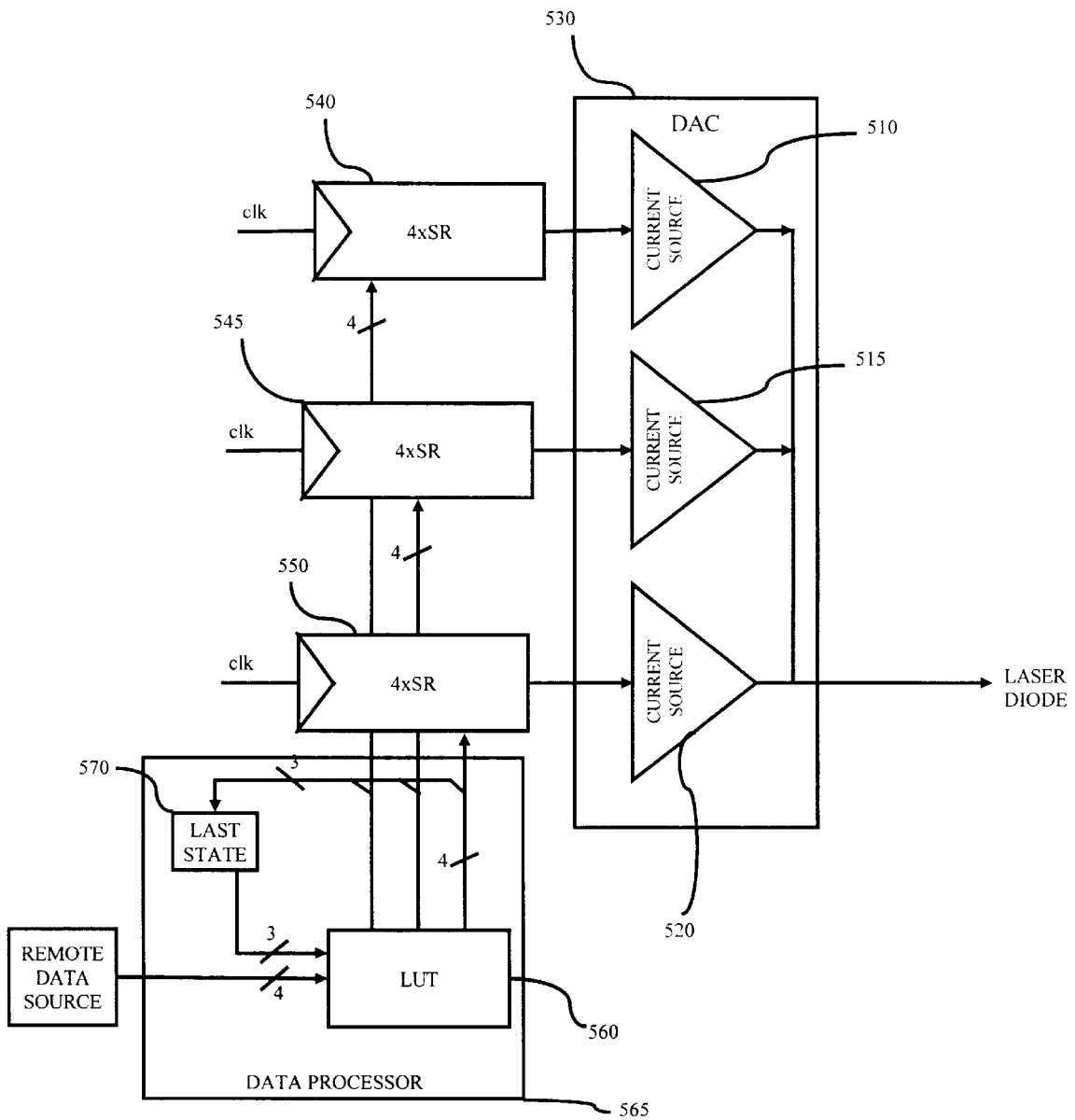
FIG. 5 illustrates a modulator designed in accordance with a second exemplary embodiment of the invention.

By eliminating dithering, the frequency response of the system is restricted to 800 transitions per inch instead of the previous 3200 transitions per inch while maintaining the 3200 bits per inch addressability by controlling when the transitions occur in the fast-scan direction and controlling the intensity level transitioned to in the slow-scan direction. This reduction in the number of transitions performed per inch advantageously reduces current source cost and improves exposure reproducibility. It is foreseeable that a second exemplary embodiment may be implemented as shown in FIG. 5, in which the DAC 530 includes three current sources 510, 515, 520. The modulator also includes three 4× shift-registers 540, 545 and 550 coupled to the three current sources 510, 515 and 520 respectively. The modulator also includes a data processor 565 that includes a look up table (LUT) 560 and a last-state-register 570. The last-state-register 570 stores data indicating the last state output to the three shift-registers 540, 545 and 550.

Each current source 510, 515 and 520 is set to provide one-third the power necessary to generate nominal, full exposure level. By optionally operating the current sources individually and in tandem, the current sources can be driven to sum to 0, ⅓, ⅔ or full power. That is, when current sources 510, 515 and 520 are not operated the resulting power sum is 0. When one current source 510 is operated, the resulting power sum is one third of full power. When two current sources 510, 515 are operated the resulting power sum is two thirds of full power. When all current sources 510, 515, 520 are operated, the resulting power sum is full power.

Four bits of image data from a remote data source are provided to the data processor 565 and compared with the LUT 560. Based on the four bits of image data provided by the remote data source, the data processor 565 outputs instruction data to the 4× shift-registers 540, 545 and 550. The instruction data is in the form of four bits of information that indicate present intensity levels to be implemented during a specific time-slot by the current sources 510, 515 and 520 of the DAC 530. The shift-registers 540, 545 and 550 control the operation of the current sources 510, 515 and 520, respectively, to control the power output to the light source during image rendering.

Additionally, three bits indicating the intensity levels sent to the shift-registers 540, 545 and 550, one for each shift-register, are transmitted to the last-state-register 570 from the LUT 560. Because only one bit transition is allowed during rendering of each output pixel, the data sent to the last-state-register 570 is used by the data processor 565 to provide instructions on how perform a next intensity level transition, as explained below. Thus, a previous intensity level input to the shift-registers 540, 545 and 550 is saved in the last-state-register 570 and is used to formulate instruction data used to perform subsequent intensity level transitions in subsequent output pixels.

Four bits of intensity level and transition time data are provided by the LUT 560 of the data processor 565 to each of the shift-registers 540, 545 and 550. As in the first exemplary embodiment, nibbles of instruction data provided to the shift-registers 540, 545 and 550 can differ in what intensity level is instructed. However, the timing of any intensity level transition will be the same for all shift-registers 540, 545 and 550.

Table 4 enumerates one example of the sixteen possible permutations of transition time/intensity level information provided by the remote source to the data processor 565. The second column indicates the data actually transmitted to the LUT 560 of the data processor 565 by the remote data source. The third column indicates the instruction data nibble transmitted to the shift-register 540. The fourth column indicates the instruction data nibble transmitted to the shift-register 545.

Accordingly, four bits of intensity level and transition time data are provided by the LUT 560 of the data processor 565 to each of the shift-registers 540, 545, 550.

It is important to note that nibble of instruction data provided to shift-register 540 can and often will be different than the nibble of instruction data provided to shift-registers 545, 550. However, the timing of any intensity level transition will be the same for both shift-registers 540, 550 if both shift-registers are instructed to transition to a different intensity level.

Table 4 enumerates one example of the twelve possible permutations of transition time/intensity level information provided by the remote source to the data processor 565. The second column indicates the data actually transmitted to the LUT 560 of the data processor 565 by the remote data source. The third column indicates the instruction data nibble transmitted to the shift-register 540. The fourth column indicates the instruction data nibble transmitted to the shift-register 545. The fifth column indicates the instruction data nibble transmitted to the shift-register 550.

TABLE 4

| TIME-SLOT/ INTEN- SITY STATE | LUT IN- PUT | OUTPUT TO SHIFT- REGISTER 540 | | | | OUTPUT TO SHIFT- REGISTER 545 | | | | OUTPUT TO SHIFT- REGISTER 550 | | | |
|---|---|---|---|---|---|---|---|---|---|---|---|---|---|
| 0/0 | 0000 | 0 | 0 | 0 | 0 | 0 | 0 | 0 | 0 | 0 | 0 | 0 | 0 |
| 0/1 | 0001 | 1 | 1 | 1 | 1 | 0 | 0 | 0 | 0 | 0 | 0 | 0 | 0 |
| 0/2 | 0010 | 1 | 1 | 1 | 1 | 1 | 1 | 1 | 1 | 0 | 0 | 0 | 0 |
| 0/3 | 0011 | 1 | 1 | 1 | 1 | 1 | 1 | 1 | 1 | 1 | 1 | 1 | 1 |
| 1/0 | 0100 | LS | 0 | 0 | 0 | LS | 0 | 0 | 0 | LS | 0 | 0 | 0 |
| 1/1 | 0101 | LS | 1 | 1 | 1 | LS | 0 | 0 | 0 | LS | 0 | 0 | 0 |
| 1/2 | 0110 | LS | 1 | 1 | 1 | LS | 1 | 1 | 1 | LS | 0 | 0 | 0 |
| 1/3 | 0111 | LS | 1 | 1 | 1 | LS | 1 | 1 | 1 | LS | 1 | 1 | 1 |
| 2/0. | 1000 | LS | LS | 0 | 0 | LS | LS | 0 | 0 | LS | LS | 0 | 0 |
| 2/1 | 1001 | LS | LS | 1 | 1 | LS | LS | 0 | 0 | LS | LS | 0 | 0 |
| 2/2 | 1010 | LS | LS | 1 | 1 | LS | LS | 1 | 1 | LS | LS | 0 | 0 |
| 2/3 | 1011 | LS | LS | 1 | 1 | LS | LS | 1 | 1 | LS | LS | 1 | 1 |
| 3/0 | 1100 | LS | LS | LS | 0 | LS | LS | LS | 0 | LS | LS | LS | 0 |
| 3/1 | 1101 | LS | LS | LS | 1 | LS | LS | LS | 0 | LS | LS | LS | 0 |
| 3/2 | 1110 | LS | LS | LS | 1 | LS | LS | LS | 1 | LS | LS | LS | 0 |
| 3/3 | 1111 | LS | LS | LS | 1 | LS | LS | LS | 1 | LS | LS | LS | 1 |

As in Table Three, "LS" indicates the last modulation intensity state input to each shift-register 540, 545, 550 during rendering of the previous output pixel. Therefore, when the data processor 565 formulates the instruction data for the shift-registers 540, 545 and 550 the data processor uses the last state data stored in the last-state-register 570. Table 4 is merely an example of one possible configuration of the LUT 560. It should be recognized that the specific instruction data nibbles transmitted to the shift-registers 540, 545, 550 may be different than those listed in Table 4 while resulting in the same overall power provided by the current sources 510, 515, 520. For example, although time-slot/intensity level 3/2 may be implemented by feeding "LS LS LS 1" to both shift registers 540, 545 and feeding "LS LS LS 0" to shift-register 555, the same overall power level may be implemented by feeding "LS LS LS 1" to both shift registers 540, 555 and feeding "LS LS LS 0" to shift-register 545. Thus, Table 4 is but one example of a potential LUT configuration.

As in the first exemplary embodiment, it is important to note that there need not be any intensity level transition during rendering of an output pixel. Such would be the case when an intensity level remains constant when rendering a number of output pixels that each have the same grayscale value. It is also possible that only one of the shift-registers would experience an intensity level transition.

Figure 6:
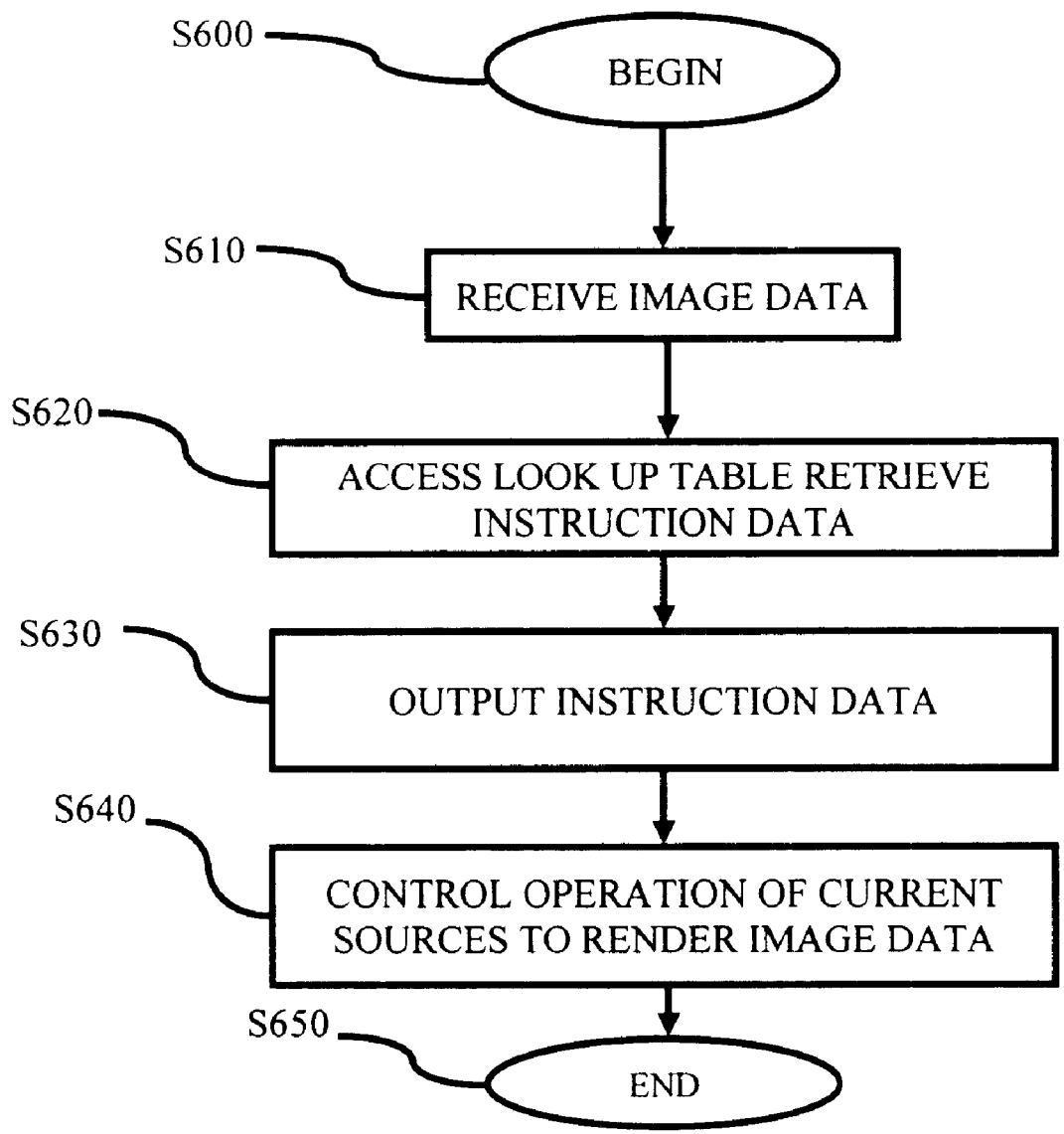
FIG. 6 illustrates a method for image rendering in accordance with the exemplary embodiments of the invention.

FIG. 6 illustrates a method for rendering image data in accordance with the exemplary embodiments of the invention. As shown in FIG. 6, the method begins in step S600 and proceeds to step S610. In step S610, input image data is received from a remote data source and control proceeds to step S620. In step S620 a power level and intensity information in, for example, a LUT, is accessed and instruction data is retrieved from the LUT based on the image data received from the remote data source. Control then proceeds to step S630. In step S630, the retrieved instruction data is output to a plurality of current sources via a plurality of corresponding shift-registers. Control then proceeds to step S640, in which the current sources provide power to the a plurality of light sources to render an image in accordance with the input image data based on the instruction data. Control then proceeds to step S650, in which the method ends.

In summary, the exemplary embodiments of the invention allow 3200×3200 shifting of halftone dots and binary images for electronic registration purposes without a typically associated high data bandwidth and cost required to drive a high speed current source. Additionally, the systematic noise caused by using dithering a digital shift-register is eliminated.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, although the exemplary embodiments have been explained in relationship to driving a single light source, it is foreseeable that the components illustrated in FIGS. 4 and 5 may be duplicated to drive multiple light sources. Therefore, four bits of information would be provided from a remote data source for driving each light source via referring to LUTs for instruction data information for corresponding shift registers.

Additionally, although the two current sources of the first exemplary embodiment may provide half the power necessary to drive a light source at full intensity, and the three current sources of the second exemplary embodiment may provide one third the power necessary to drive a light source at full intensity, the power levels need not be strictly adhered to. Specifically, the first exemplary embodiment may include one current source that provides full power and one current source that provides half power to provide various combinations. Similarly, the second exemplary embodiment may include one current source that provides full power, one current source that provides two thirds power and one current source that provides one third power. Moreover, it is important to note, that such alternative power level configurations provide improved operation by eliminating calibration issues in that the current sources need not be interdependently calibrated to provide a true full power level by combining them. In other words, by utilizing one current source that provides true full power, it is not necessary that the current sources be calibrated so as to provide full power when combined. As a result these alternative power level configurations allows for more opportunity to adjust the current levels independently to be specific to the other equipment in the system.

In accordance with the exemplary embodiments of the invention, it is foreseeable that two or more current sources may be used to implement the invention. However, the more current sources that are used, the greater the amount of data that must be provided from the remote data source. For instance, although the first and second exemplary embodiments of the invention illustrated in FIGS. 4 and 5 require only a nibble of image data to access the look up tables, that amount of data must increase if more than three current sources are utilized to render images. Specifically, Tables 3 and 4 only use a maximum of sixteen different time-slot/intensity state combinations. However, if the invention were practiced in conjunction with a DAC including four current sources, then the number of different time-slot/intensity state combinations increases to twenty. Thus, using four current sources requires five bits of input image data from the remote data source. Thus, the amount of data that must be transmitted from a remote data source increases as the number of current sources increases.

Also, although exemplary embodiments of the invention have been explained in connection with four bit nibbles of data and limited to a single transition in the fast-scan direction, it is foreseeable that providing data in byte form, i.e., eight-bit words, allows the opportunity to provide further addressability in the fast-scan direction. Utilizing eight-bit words in conjunction with an increased number of current sources allows the addressability to be increased. Therefore, the exemplary embodiments of the invention are economically extendible to other addressabilities such as 6400×64000 bit per inch. Additionally, the invention is useful for scan pitches other than 1600 scans per inch, e.g., 1200 spots per inch that may be used in conjunction with more advanced print engines.

What is claimed is:

1. A modulators comprising:
a data processor that receives input image data that indicates an intensity level to be provided by the modulator and a timing of a transition to that intensity level during rendering of a next output pixel;
a plurality of shift-registers coupled to the data processor and receiving instruction data from the data processor;
an adjustable current source including a plurality of constituent current sources, each constituent current source corresponding to one of the plurality of shift-registers, plurality of constituent current sources operate in combinations to provide different levels of power to operate a light source at various intensity levels,
wherein a number of intensity level transitions is limited to a single transition per output pixel, the single intensity level transition may occur at any one of four time-slots.

2. The modulator of claim 1, wherein the data processor includes a look up table that includes the instruction data to be output to the shift-registers, the instruction data indicating the intensity level during rendering of the next output pixel and the time of the transition to that intensity level, the instruction data being accessible based on a relationship between the instruction data and the input data received by the data processor so that the input data indicates the intensity level to be provided by the modulator and the timing of the transition to that intensity level during rendering of the output pixel.

3. The modulator of claim 1, wherein the data processor includes a last-state-register that stores a last intensity level provided by each of the plurality of constituent current sources during rendering of a last output pixel.

4. The modulator of claim 1, wherein four bits of instruction data are output to each of the shift registers, the four bits of instruction providing intensity level information for each of four time-slots during rendering of the next output pixel.

5. The modulator of claim 1, wherein the modulator receives four bits of input image data from a data source per output pixel.

6. The modulator of claim 1 wherein the modulator is implemented as part of an image rendering system.

7. The modulator of claim 1, wherein the modulator performs modulation of a laser diode intensity.

8. The modulator of claim 1, wherein the modulator performs modulation of the adjustable current source amongst a minimum intensity level, a maximum intensity level and at least one intermediate intensity level which is intermediate between the minimum and maximum intensity levels.

9. The modulator of claim 8, wherein the modulator performs modulation of the adjustable current source amongst a minimum intensity level, a maximum intensity level and two intermediate intensity levels which are intermediate between the minimum and maximum intensity levels.

10. The modulator of claim 1, wherein a timing of a transition of the light source intensity level affects image rendering in the fast-scan direction.

11. The modulator of claim 1, wherein a level to which the adjustable current transitions affects image rendering in the slow-scan direction.

12. The modulator of claim 1, wherein each of the constituent current sources provides a maximum intensity level that is half of a full power necessary to drive the light source at full intensity.

13. The modulator of claim 1, wherein each of the constituent current sources provides a maximum intensity level that is one-third of a full power necessary to drive the light source at full intensity.

14. A method of rendering image data, the method comprising:

receiving input image data from a remote data source that indicates an intensity level to be provided and a timing of a transition to that intensity level during rendering of a next output pixel;

retrieving instruction data based on the received input image data;

outputting the retrieved instruction data to a plurality of constituent current sources of an adjustable current source via a plurality of corresponding shift registers;

operating the plurality of constituent current sources in combinations in accordance with the instruction data to provide different levels of power to operate a light source at various intensity levels during rendering of the next output pixel, wherein a number of modulation level transitions is limited to a single transition per output pixel, the single intensity level transition may occur at any one of four slots.

15. The method of rendering image data of claim 14, wherein outputting the retrieved instruction data further comprises accessing a look up table within a data processor, the look up table including the instruction data.

16. The method of claim 14, wherein the instruction data indicates the intensity level transitioned to during rendering of the next output pixel and the time of the transition to that intensity level.

17. The method of claim 14, wherein four bits of instruction data are output to each of the shift registers, the four bits of instruction providing intensity level information for each of four time-slots during rendering of the next output pixel.

18. The method of claim 14, wherein four bits of input image data from a data source per output pixel.

19. The method of claim 14, wherein modulation controls a laser diode intensity.

* * * * *